Oct. 4, 1927.
G. T. WALKER
1,644,161
PROCESS FOR CRYSTALLIZING LIQUIDS
Filed March 24, 1924 2 Sheets-Sheet 2
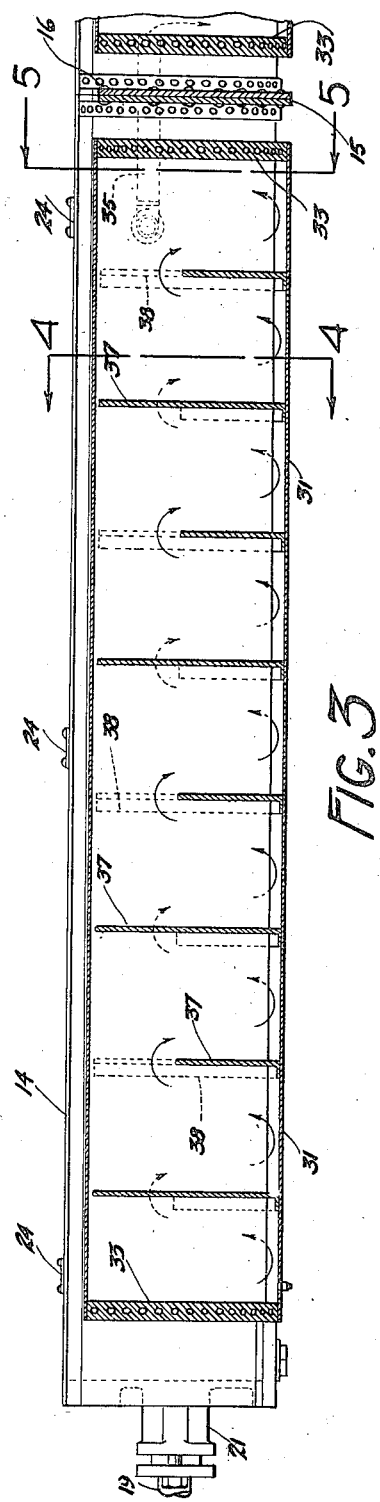
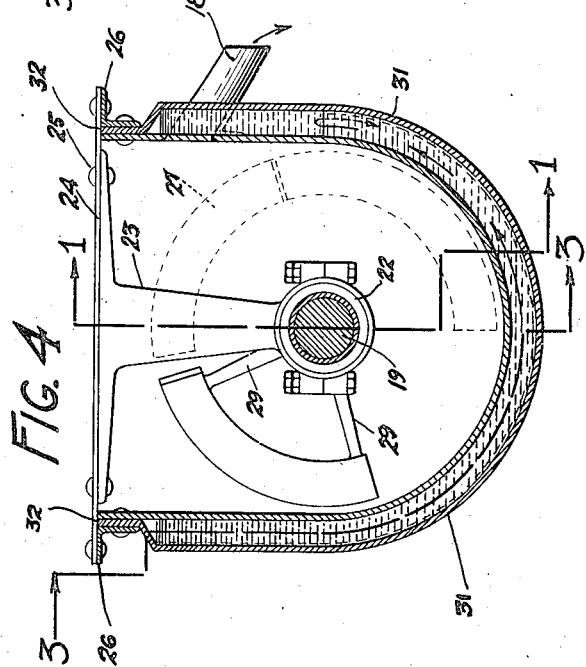
INVENTOR
GEORGE T. WALKER
By Paul Paulo Moore
ATTORNEYS Patented Oct. 4, 1927.

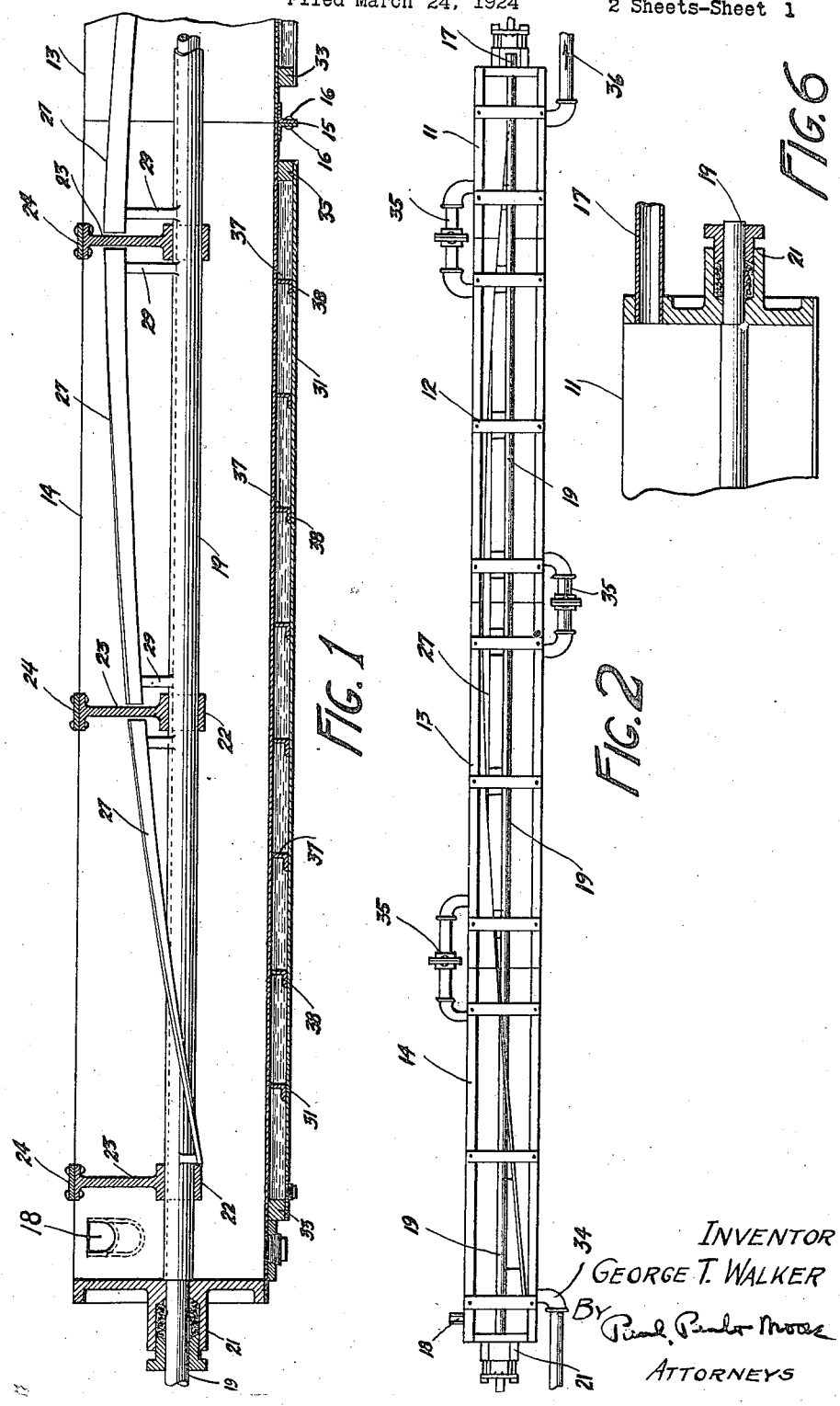

1,644,161

UNITED STATES PATENT OFFICE.

GEORGE T. WALKER, OF MINNEAPOLIS, MINNESOTA.

PROCESS FOR CRYSTALLIZING LIQUIDS.

Original application filed November 28, 1921, Serial No. 518,341. Divided and this application filed March 24, 1924. Serial No. 701,524.

In a great many chemical processes, a hot saturated solution of a compound is produced. This compound can be secured in a relatively pure form by cooling the solution. This cooling was formerly effected by allowing the solution to stand in large tanks or vats where cooling was spontaneous. This method gave large crystals and generally, they united in large masses which adhered very firmly to the walls and bottom of the tank. A great deal of manual labor was required for the removal of the product, cooling was slow and dependent on the temperature of the air. That very simple process when applied on a large scale resulted in a high labor cost and a heavy investment for tanks and buildings. The product had to be ground or pulverized if large lumps were not desirable and it was subject to various forms of contamination during handling. It was found that the process could be improved by stirring the solution from time to time and the use of a jacketed tank which was watercooled would hasten the rate of cooling provided some means was provided to keep the cooling surface clear from the layer of crystals which tended to form on it.

In the effort to apply the above principles three styles of mechanical crystallizers were produced: The so-called Buffalo crystallizer which was simply a large water-jacketed saucer with a vertical shaft bearing two plows which scraped the bottom and sides as they revolved. Another arrangement comprised a tank of approximately equal depth and diameter provided with coils for the cooling medium and a rapidly revolving propeller or stirrer which kept the surfaces of the coils relatively clean because of the scouring action of the rapidly whirling liquid and crystals. The third commercial device was the Bach crystallizer which was a large horizontal jacketed cylinder provided with slowly moving scrapers to remove the crystals from the inner surface of the cylinder.

While each of these types has been used considerably, they all required considerable attention and were very wasteful of water if it were necessary to cool the liquid to a temperature near that of the cooling water. Furthermore, in these devices, the wastage of cooling water was excessive because during the latter stages of cooling each batch, the cooling water running from the crystallizer was practically as cold as when it entered.

In many processes, the final temperature of the cooled liquid must be closely controlled in order to avoid contamination of the product by crystallization of some form of impurity which would separate when the temperature was carried too low. To avoid this, when using batch machines, which produced only a small tonnage per unit, it was necessary to exercise most careful control of the cooling.

An object of this present invention is to provide a process for carrying out the above purposes which is economical in the use of cooling water, since the cold water cools the liquid and, as it progresses through the apparatus employed, is continuously cooling a warmer liquid, which may be carried out with apparatus that is self-discharging, occupies substantially a minimum of floor space, may be inexpensively constructed, is readily accessible at all times and points; and requires a small amount of power and practically no labor or attention; which can be regulated continuously to discharge crystals of uniform size at a substantially constant temperature and which produces practically pure crystals from an impure liquid which are much less fragile than those produced by other processes or apparatus and hence produce less crystal dust when handled.

One of the main objects of this novel process is to lift the crystals to the surface of the liquid and to allow them to fall back gradually through the crystallizable solution.

Another object of the invention is to produce crystals of larger and more uniform size.

Other objects of the invention will more fully appear from the following description and the accompanying drawings and will be pointed out in the annexed claims.

In the drawings there has been disclosed a structure designed to carry out this novel process and its objects but it is to be understood that the process is not confined to the exact structures shown as various changes in the process and structures may be made within the scope of the claims which follow.

In the drawings:

Figure 1 is a longitudinal median sectional view of the apparatus on the line 1—1 of Figures 4 and 5;

Figure 2 is a plan view of the assembled apparatus;

Figure 3 is a longitudinally sectional view, on the lines 3—3 of Figures 4 and 5;

Figure 4 is a cross-sectional view on the line 4—4 of Figure 3;

Figure 5 is a similar view on the line 5—5 of Figure 3; and

Figure 6 is a sectional view of the liquid intake end of the apparatus.

This present process application is divisional of applicant's prior co-pending application, Serial No. 518,341, filed November 28, 1921.

This novel process is broadly directed to promoting the growth of crystals which consists in moving the crystals through a substantially saturated crystallizable solution to cause deposition of the dissolved substance upon the crystals. More particularly, the process promotes the crystal growth by repeatedly dropping the crystals through the substantially saturated crystallizable solution or cooling such solution to a substantially saturated condition so that it is just ready to deposit small portions of the dissolved substance upon crystals moved therethrough.

This novel process may conveniently be explained in connection with the selected embodiment of an apparatus for carrying it out which is shown in the drawings.

This apparatus or crystallizer broadly includes a chamber to receive the crystallizable solution. This chamber is water-jacketed and the cooling water flows through on the counter-current principle. A modified form of screw-conveyor extends through the chamber and has a shaft with one or more ribbons which make less than a complete turn. A crystallizer of this preferred type may, for example, be forty feet long and the shaft in carrying out the process may be rotated about seven revolutions per minute in order that the growing crystals may be very slowly moved or advanced through the heated liquid as it cools.

The apparatus shown in the drawings includes a chamber substantially U-shaped in cross-section and thus open along the top. This chamber is preferably formed of sheet steel shaped to the desired form. Preferably too, the apparatus is made of a plurality of similar chamber units adapted for assembly into an elongated apparatus such, for example, as a forty-foot assembly. In Figure 2, there are shown four such chamber units 11, 12, 13 and 14 in assembled terminally abutting relation. Adjacent units are held together with a water-tight connection by means of complementary angle irons 15 having portions respectively held by rivets 16 to each other and to the terminal portions of the abutting ends of adjacent chamber units. The semi-cylindrical or U-shape is employed because it is readily accessible at any point and at any stage of the process. For this reason, it is much easier to start it again if failure of power results in a shut-down. A cylindrical chamber lacks such advantage.

The elongated chamber of the assembled apparatus is provided with an intake connection 17 adjacent one end of the chamber by means of which the heated liquid may be introduced within the open-topped chamber and with a discharge connection 18 adjacent the opposite end of the chamber. Means are provided within the chamber to impel the heated liquid, to raise and drop the crystals and to advance them through the chamber. A shaft 19 extends longitudinally through the chamber and is provided with gland bearings 21 at each end of the chamber. As the shaft, in this embodiment of the apparatus, is long, it is desirable to provide intermediate bearings therefor. Such bearings 22 are integrally depended from hangers 23 carried by cross-arms 24 mounted transversely upon the longitudinal edges of the two chamber sides. The hangers are secured to the cross-arms 24 by rivets 25 and the cross-arms are in turn held to the chamber sides by means of the angle plates 26 riveted both to the sides of the chamber and to the terminal portions of the cross-arms as shown in Figures 4 and 5. An elongated or ribbon-like blade is substantially spirally carried by the shaft 19. This blade is preferably not continuous in order that the intermediate shaft bearings 22 may be employed. Hence, the blade is formed of a plurality of complementary sections 27. The blade sections 27 are carried by spokes 29 suitably secured to the shaft at spaced intervals. As is shown in Figure 2, this blade is substantially spirally disposed about the shaft 19 but preferably does not effect a complete turn about the shaft so that the crystals may slowly be lifted from the bottom of the chamber to the liquid surface and then dropped through the liquid again and so that the crystals and liquid may be sluggishly advanced by the slow rotation of the shaft 19 from any power source not necessary to be shown.

The heated liquid may be introduced within the chamber by way of the intake connection 17 indicated at the right end of Figure 2 and as is shown in Figure 6. This end may be termed, for sake of clarity, the front end of the apparatus while the opposite end having the liquid discharge connection 18 may be termed the rear end. The liquid and crystals are very slowly moved by the shaft blade toward the rear end of the machine and during such motion, the liquid is gradually cooled by water running through the surrounding water jacket in an opposite direction.

The water jacket is provided with means for causing the current of water to pursue a tortuous course in its transit of the chamber exterior. Similarly to the chamber, the water jacketing is effected by a plurality of units, each being secured to a chamber unit and a pipe connection being provided successively to connect the water jacket units. Each water jacket unit is formed by a casing 31 comprising a piece of sheet metal shaped to extend about its supplementary chamber unit in spaced relation thereto. The two longitudinal edge portions 32 of the casing are both inwardly offset and are held tightly against the adjacent outer surface of the chamber unit by means of the depending sections of the riveted angle plates 26. A water-tight closure of the top of the water jacket is thereby effected. The sides of the water jacket casings are closed by means of the U-shaped bars 33, the end portions of the casing extending over the outer face of the bars and rivets being passed through the casing, bars and chamber units. The cooling water is supplied under sufficient head to the water inlet connection 34 and thus enters the rear unit 14 and thereafter is successively passed to the adjacent jacket units by means of pipe connections 35, and finally is ported through the outlet connection 36 at the front end of the apparatus.

The water is caused to follow a tortuous course from side to side of the chamber by means of baffle plates 37. These baffle plates are elongated metallic strips with a narrow marginally offset flange 38 (see Figure 1) whereby each may be suitably secured to the inner face of the adjacent casing unit. As is indicated in Figure 3, one leg of each of these U-shaped baffle plates 37 is shorter than the other, and these plates are alternately disposed in spaced relation in each water jacket unit. Thus, the moving water passes over the short leg of one baffle plate at one side of the chamber unit and must then travel to the other side of the chamber unit to the next short leg, etc. Such baffled course of the cooling water causes a more effective and uniform cooling of the chamber and therefore of the heated liquid therein.

The jacket as above described is so constructed that the cooling medium can be distributed in a thin layer in order to obtain a high velocity of flow with a relatively small amount of water. High velocity causes an increased heat transmission. The baffles also serve the same purpose as they cause the cooling medium to follow a long route and therefore to travel at a high rate of speed. Transverse baffles are used in preference to longitudinal baffles or partitions in order that the water may be continuously warmed as it passes through the machine and yet always be cooler than the liquid to be cooled at any point. With reference to the use of longitudinal baffles or partitions, it may be noted that, as the water was warmed, it would pass alternately from the warm to the cool end of the crystallizer and therefore would be warmer than the liquid to be cooled at the cool end of the machine unless an unnecessarily large volume of water was used. Such baffling is not based on the true counter-current principle. While the jacket in this novel machine causes a high velocity of the cooling medium, the passages are large and the use of large connections from section to section allows the use of a large volume of water and therefore the use of very long units for large capacity with minimum attendance.

In the present operation of this apparatus in connection with heated crystallizable liquid, such liquid is supplied to the chamber by means of the intake connection 17 so that the chamber is filled to the level of the discharge connection 18. The water runs from the rear end to the front end through the water jacketing. The shaft 19 is slowly revolved so that the liquid is very gradually moved toward the rear of the chamber while any crystals formed by lifting and dropping through the cooling of the liquids are likewise moved toward the rear end of the apparatus. The cooled liquid is slowly discharged through the discharge connection 18 carrying with it any crystals which are capable of floating or which are lifted thereto whereupon the crystals are subsequently recovered, or the crystals may be precipitated to the bottom of the casing and slowly gathered at the rear end through action of the impeller whereat they may be recovered from time to time. It will be noted that a spiral of extremely long pitch is used. A standard spiral of a pitch about equal to the diameter would merely push the crystals forward without lifting them so that they would not be discharged unless there were an opening in or near the bottom. Such an opening would make it impossible to fill the machine with liquid and therefore only a small portion of the cooling surface would be actually available.

The long spiral has a lifting effect so that the crystals are constantly and repeatedly lifted and allowed to fall through the liquid. During this process growth occurs so that coarse crystals can be produced although the rate of stirring is relatively rapid. This lifting and rapid stirring keeps the cooling surface clean and prevents insulation although there is no contact of metal with metal which would cause a great increase in the power required and result in contamination of the crystals by the particles of metal removed by such contact. To keep such contact would also require frequent adjustment and cause severe wear. This lifting effect also furnishes a means of discharging the crystals from the machine so that it can be operated continuously. When first filled very few crystals are discharged but they are gradually carried forward by the spiral and the flow of the liquid which is being constantly introduced at the hot end. In time the density of the mixture of crystals and liquid at the cool end becomes sufficient to prevent rapid sinking of the crystals as they are lifted by each blade of the spiral. Each blade end lifts a mass of crystals to the discharge opening and some of them are carried out by the outflowing liquor. This discharge is perfectly automatic without the aid of any special mechanism.

By the above means the crystals are being constantly dropped through a saturated solution which is just ready to deposit a small portion of the dissolved salt since it is being constantly cooled. This is deposited on the crystals which have already been formed instead of forming nuclei and causing the production of a great many fine crystals. It is a rather common experience in operating batch crystallizers that crystals do not commence to form gradually but the liquid becomes slightly super-cooled and suddenly a great number of extremely fine crystals form. Such batches are generally decidedly different in appearance from normal batches.

By the employment of this novel process, there is avoided the present laborious, time-consuming and contaminating practice of scraping crystals from the sides of a vat, from strips or strings therein, and of digging them out by pick and shovel from the vat bottom. This novel process is a continuous one, the crystals are gradually carried forwardly, but, more particularly, each is slowly lifted adjacent the surface of the liquid and then allowed to fall gradually back through the liquid solution. The crystals formed are generally perfect specimens with all faces symmetrically developed and not mere fragments. In fact, the crystals grow while in suspension during a long period of time, although the feed and discharge are continuous. By controlling the feed of the liquid, the cooling medium and the time required for the crystals and liquid to pass through the apparatus, the size of the crystals may be increased or decreased. This process offers the advantages of continuity of action, centralization of production, and a reduction of cubical space, labor charges, volume of cooling water and power used to carry it out.

Having thus described my invention, what I claim as new and desire to secure by Letters-Patent, is:

1. The process for forming crystals which consists in causing a heated crystallizable solution to pass through a container, maintaining a body of liquid at a substantially constant level in the container with overflow discharge, progressively cooling the solution during its passage to cause saturation of the solution and the formation of crystals, lifting the crystals and dropping them through the solution to assist in their formation, and advancing the crystals through the container and lifting them to present them to the outlet for discharge with the outflowing solution.

2. The process of forming crystals which consists in causing a heated crystallizable solution to pass through a container, maintaining a body of liquid at a substantially constant level in the container with overflow discharge, progressively cooling the solution during its passage to cause saturation of the solution and the formation of crystals, lifting the crystals and dropping them through the solution to assist in their formation, advancing the crystals through the container and lifting them to present them to the outlet for discharge with the out-flowing solution, and regulating the size of the crystals to be formed by varying the degree of concentration of the crystallizable solution used.

In witness whereof, I have hereunto set my hand this 20th day of March 1924.

GEORGE T. WALKER.